J. D. Robinson,
Water Wheel.
Nº 3,804.
Patented Oct. 24, 1844.
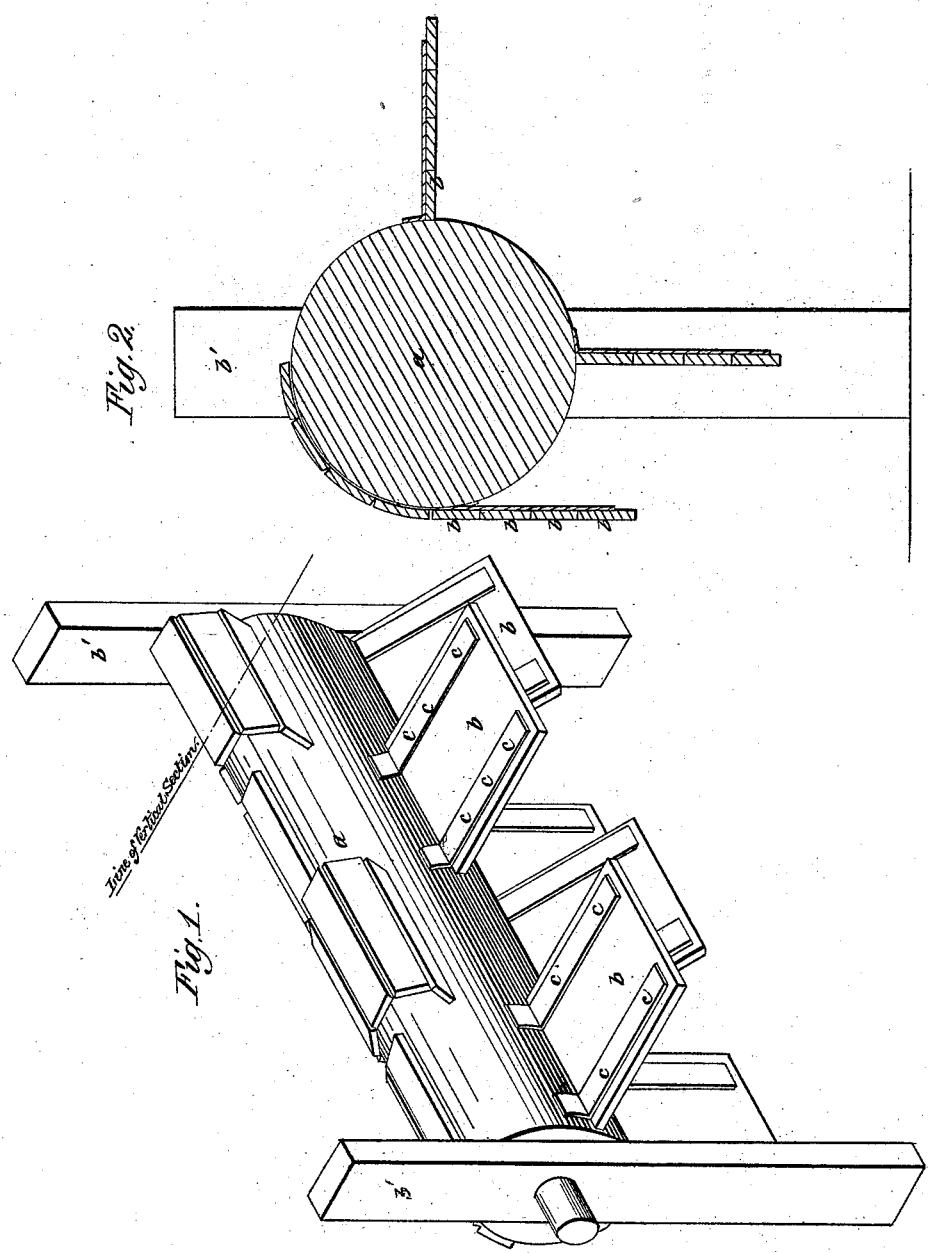

UNITED STATES PATENT OFFICE.

J. D. ROBINSON, OF PEORIA, ILLINOIS.

WATER-WHEEL.

Specification of Letters Patent No. 3,804, dated October 24, 1844.

*To all whom it may concern:*

Be it known that I, J. D. ROBINSON, of the town and county of Peoria and State of Illinois, have invented a new and Improved Water-Current Water-Wheel; and I do hereby declare that the following is a true and exact description thereof, reference being had to the accompanying drawing, which forms a part of this specification, in which—

Figure 1, is an isometrical view. Fig. 2, is a vertical section.

The nature of my invention consists in forming a series of buckets on a horizontal shaft or cylinder; said buckets being composed of narrow strips fastened by a flexible connection to the shaft or cylinder.

The construction and operation are as follows: A cylinder or shaft (*a*), is formed of any suitable materials, and is supported firmly in bearings (*b*), in which its gudgeons turn. Around the periphery of this cylinder, marked (*a*,) in the drawing the buckets are put, two or more being placed on a horizontal line parallel with each other and with a space between them the width of a bucket. The buckets are formed of a series of narrow parallel slats (*b*,) fastened together at the edges and to the cylinder aforesaid by chains, links or joints (*c*,) which permit them to fold down around the cylinder or stand out radially, both of which positions are shown in the drawings.

When this wheel is placed in a stream at least one half or two thirds of it should be under water (and it may be entirely immersed) and as the lower buckets hang down they will be forced around by the current; in the meantime those that are above and folded around the shaft will be acted on by the water and forced off from the cylinder into the radial position which enables them in turn to come into the direction to take the force of the current; as they come up on the opposite side they hang in and fold around the cylinder.

Having thus fully described my invention what I claim therein and desire to secure by Letters Patent is—

The combination of the cylinder *a*, and buckets *b*, constructed and arranged in the manner and for the purpose above described.

J. D. ROBINSON.

Witnesses:
J. J. GREENOUGH,
T. C. DOORE.